(12) United States Patent
von Haeften et al.

(10) Patent No.: US 6,935,203 B2
(45) Date of Patent: Aug. 30, 2005

(54) SYSTEM AND METHOD FOR DETERMINING THE GEAR SELECTION BY MEANS OF A SELECTOR LEVER

(75) Inventors: Reinhard von Haeften, Stuttgart (DE); Klaus Ries-Mueller, Bad Rappenau (DE); Joachim Luh, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/362,539
(22) PCT Filed: May 29, 2002
(86) PCT No.: PCT/DE02/01973
  § 371 (c)(1),
  (2), (4) Date: Sep. 11, 2003
(87) PCT Pub. No.: WO03/001085
  PCT Pub. Date: Jan. 3, 2003

(65) Prior Publication Data
  US 2004/0079181 A1 Apr. 29, 2004

(30) Foreign Application Priority Data
  Jun. 22, 2001 (DE) .......................................... 101 30 230

(51) Int. Cl.$^7$ .......................... F16H 63/00; G06F 17/00; G06F 19/00
(52) U.S. Cl. ............................. 74/335; 701/63; 477/907
(58) Field of Search ................................ 74/335, 336 R; 701/62–63, 34; 477/906–907

(56) References Cited

U.S. PATENT DOCUMENTS 6,591,173 B2 * 7/2003 Nada ........................... 701/29
6,722,219 B2 * 4/2004 Berger et al. ................. 74/335

FOREIGN PATENT DOCUMENTS

| DE | 37 35 184 | 5/1989 | |
| DE | 42 20 247 | 12/1993 | |
| DE | 100 27 331 | 12/2000 | |
| DE | 10032907 A1 * | 2/2001 | ........... F16H/61/12 |

* cited by examiner

Primary Examiner—Tisha Lewis
(74) Attorney, Agent, or Firm—Walter Ottesen

(57) ABSTRACT

The invention relates to a system for determining the gear selection utilizing a selection lever in an automatic transmission having at least two units (10, 12) for detecting the selection lever position (14, 16, 18, 20, 22). Each unit (10, 12) generates a signal corresponding to the detected selection lever position (14, 16, 18, 20, 22). The system also has a device for evaluating the signals. Based on the signals, the gear selection can be determined while considering plausibility rules. The invention relates further to a method for determining the gear selection utilizing a selection lever in an automatic transmission.

12 Claims, 3 Drawing Sheets

SYSTEM AND METHOD FOR DETERMINING THE GEAR SELECTION BY MEANS OF A SELECTOR LEVER

RELATED APPLICATIONS

This application is the national stage of International Application No. PCT/DE 02/01973, filed May 29, 2002, designating the United States which claims priority from German patent application no. 101 30 230.4, filed Jun. 22, 2001, the entire contents of which are incorporated herein by reference.

FIELD OF THE INVENTION

The invention relates to a system for determining the gear selection utilizing a selection lever in an automatic transmission having at least two units for detecting the selection lever position wherein each unit generates a signal corresponding to the detected selection lever position and the system having means for evaluating the signals. The invention further relates to a method for determining the gear selection utilizing a selection lever in an automatic transmission wherein the selection lever position is detected via at least two different paths and corresponding signals are generated and the signals are evaluated.

BACKGROUND OF THE INVENTION

In automatic transmissions, for example, step automatic, CVT, ASG, the gear selection takes place utilizing a selection lever. A mechanical connection is usually present between the selection lever and the transmission. This means that the valves or switches, which are to be activated for the selection of another gear, are driven directly by the selection lever. The corresponding selection lever position is detected by means of displacement sensors and is transmitted to the transmission control apparatus.

Because of safety considerations, it has been already suggested to detect the position of the selection lever via two different paths, that is redundant information is made available for the selection lever position. In the case that different selection lever positions are detected, a switching into an emergency operation taken place immediately which either still makes possible to bring the vehicle into a service center in an emergency operation or to bring the vehicle to a suitable location or even leads to a disablement of the vehicle.

SUMMARY OF THE INVENTION

Without limiting the generality, the invention is described with respect to a continuously variable transmission (CVT) and is applicable in the same or similar manner to other automatic transmissions. Continuously variable transmissions include essentially two conical wheel pairs and a belt part designed, for example, as a thrust member belt. One of the conical wheel pairs is connected to a drive, for example, an internal combustion engine; whereas, the other conical wheel pair is connected to an output. In adjusting the transmission ratio of the continuously variable transmission and the tension of the belt part, the drive conical wheel pair and the output conical wheel pair, in general, comprise each an axially fixed and an axially movable conical wheel. The drive conical wheel pair is characterized as a drive disc or primary disc and the output conical wheel pair is also characterized as an output disc or secondary disc. The contact force of the axially movable conical wheels against the belt part takes place, in general, by the build up of a hydraulic pressure, for example, via a pump. By a suitable selection of the spacings or the contact force pressures of the conical wheels, the desired transmission ratio of the continuously variable transmission and the required tension of the belt part can be adjusted. The pump for the hydraulic drive of the conical wheels can, for example, be driven by the internal combustion engine. For the force transmission from the internal combustion engine to the drive conical pair, for example, a torque converter and a planetary set with clutches for forward and rearward travel can be provided.

The invention builds upon the class of system herein in that the gear selection can be determined based on the signals while considering the plausibility rules. On the basis of the present invention, it is therefore no longer necessary that the vehicle be transferred to standstill or perforce into emergency operation when selection lever signals are not coincident. Rather, even with different selection lever signals, the gear selection actually wanted by the driver can be realized on the basis of a consideration of plausibility rules.

It is especially preferred that, for like signals, the gear selection, which corresponds to the selection lever position, is determined. In this case, a fault-free detection of the selection lever position is present with high probability so that the plausibility considerations, which are advantageously used in other cases, are reduced to select the gear corresponding to the selection lever position.

The system of the invention is especially advantageously improved in that, for a first signal and a second signal, which correspond to different selection lever positions, a determination is made as to whether one of the signals precisely corresponds to an intermediate position of the selection lever and that, in the case that precisely one of the signals corresponds to an intermediate position of the selection lever, then the other signal is used to determine the gear selection. In this plausibility consideration, one proceeds from the situation that the driver has not brought the selection lever into an intermediate position but instead into an actually provided selection lever position. In this way, it is also probable that the selection lever position, which does not correspond to the intermediate position, is the selection lever position wanted by the driver so that this gear selection is realized in the transmission.

It is of special advantage when the system of the invention is further improved in that, for a first signal and a second signal, which correspond to different selection lever positions, plausibility rules are applied to determine the gear selection which are based on the evaluation of one or several secondary signals. Accordingly, it is not necessary to determine the probably desired gear exclusively on the basis of the different selection lever signals. Rather, additional signals, which are here characterized as secondary signals, are considered in order to realize the driver command.

In this connection, it is especially advantageous that the possible secondary signals belong to the group: turbine rpm, primary rpm, secondary rpm, output rpm, engine rpm, parking brake signals. In this way, numerous potential signals are available which can be taken into consideration in the plausibility considerations. If, for example, the selection lever position P for parking is outputted and the vehicle speed is greater than 10 km/h, then park position P would have to be evaluated as implausible.

The system of the invention is further advantageously improved in that, for a first signal and a second signal, which correspond to different selection lever positions, a fault signal is outputted and/or emergency measures are taken. A fault signal informs the driver and causes the driver to take countermeasures, for example, to drive to a service center. Further, the fault signal can function to be stored in a fault memory. Emergency measures can, for example, comprise limiting a torque.

In the system of the invention, it is especially advantageous that a signal, which corresponds to an intermediate position of the selection lever, is equivalent to the non-pressure of a signal corresponding to a selection lever position which is not an intermediate position. It is therefore basically not necessary to provide special intermediate position sensors in order to realize the present invention.

It can, however, also be useful that a signal, which corresponds to an intermediate position of the selection lever is explicitly determined via a sensor. In this way, one obtains additional information. If one proceeds with a non-present selection lever position signal that an intermediate position is present, then this assumption can be defective even when an omission of intermediate position sensors is especially economical with the view to the equipment of the vehicle. If, in contrast, one uses intermediate position sensors, then the nature and the tendency of the defective position signal are made clear and can be included in the evaluation.

The invention builds upon the class of the method in that the gear selection is determined based on the signals while considering plausibility rules. In this way, a shutdown or disablement of the vehicle can be avoided under some circumstances because the driver command can be determined with high probability notwithstanding different selection lever signals.

It is especially preferred that, with like signals, the gear selection, which corresponds to the selection lever position, is determined. Since in this case, a fault-free detection of the selection lever is present with high probability, the gear can be selected corresponding to the selection lever position.

The method of the invention is especially advantageously further improved in that, for a first signal and a second signal, which correspond to different selection lever positions, a determination is made as to whether precisely one of the signals corresponds to an intermediate position of the selection lever and that, in the case that precisely one of the signals corresponds to an intermediate position of the selection lever, the other signal is used to determine the gear selection. A condition precedent for this plausibility is that, with great probability, the driver does not tend to select an intermediate position. In this way, it can be assumed with great probability that the determined selection lever position corresponds to the driver command.

It is of special preference when the method of the invention is further improved in that, for a first signal and a second signal, which correspond to different selection lever positions, plausibility rules are applied to determine the gear selection which are based on the evaluation of one or several secondary signals. The method of the invention is very flexible with respect to the consideration of additional signals which can be included in the plausibility considerations.

In this connection, it is especially advantageous that the possible secondary signals belong to the group: turbine rpm, primary rpm, secondary rpm, output rpm, engine rpm, engine torque, parking brake signal. The latter are some examples of quantities which can be advantageously used in the context of the method of the invention.

The method of the invention is further advantageously improved in that, for a first signal and a second signal, which correspond to different selection lever positions, a fault signal is outputted and/or emergency measures are taken. A fault signal permits the driver to take measures, for example, to bring the vehicle into a service center. Likewise, a fault signal can be read into a fault memory in the context of the method of the invention. Emergency measures can, for example, include a limiting of torque.

In the method of the invention, it is especially advantageous that a signal, which corresponds to an intermediate position of the selection lever, is equivalent to the non-presence of a signal corresponding to a selection lever position which is not an intermediate position. Accordingly, it is not necessary to provide separate intermediate position sensors which is in the sense of an especially simple configuration of the system.

It can, however, also be useful that a signal, which corresponds to an intermediate position of the selection lever is explicitly determined via a sensor. With the explicit determination of the intermediate positions, the method is more complex but simultaneously also more reliable.

The invention is based on the realization that a plausibility of redundant selection lever signals can be carried out via the evaluation of different motor management signals and transmission control signals. On this basis, it is possible to continue to drive the vehicle without limitations as to driving comfort in that a still correct selection lever signal or gear selection can be applied while considering, for example, rpms. Likewise, it is in the context of the present invention to detect more than two selection lever signals and, accordingly, to undertake plausibility considerations with three or a plurality of selection lever signals.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
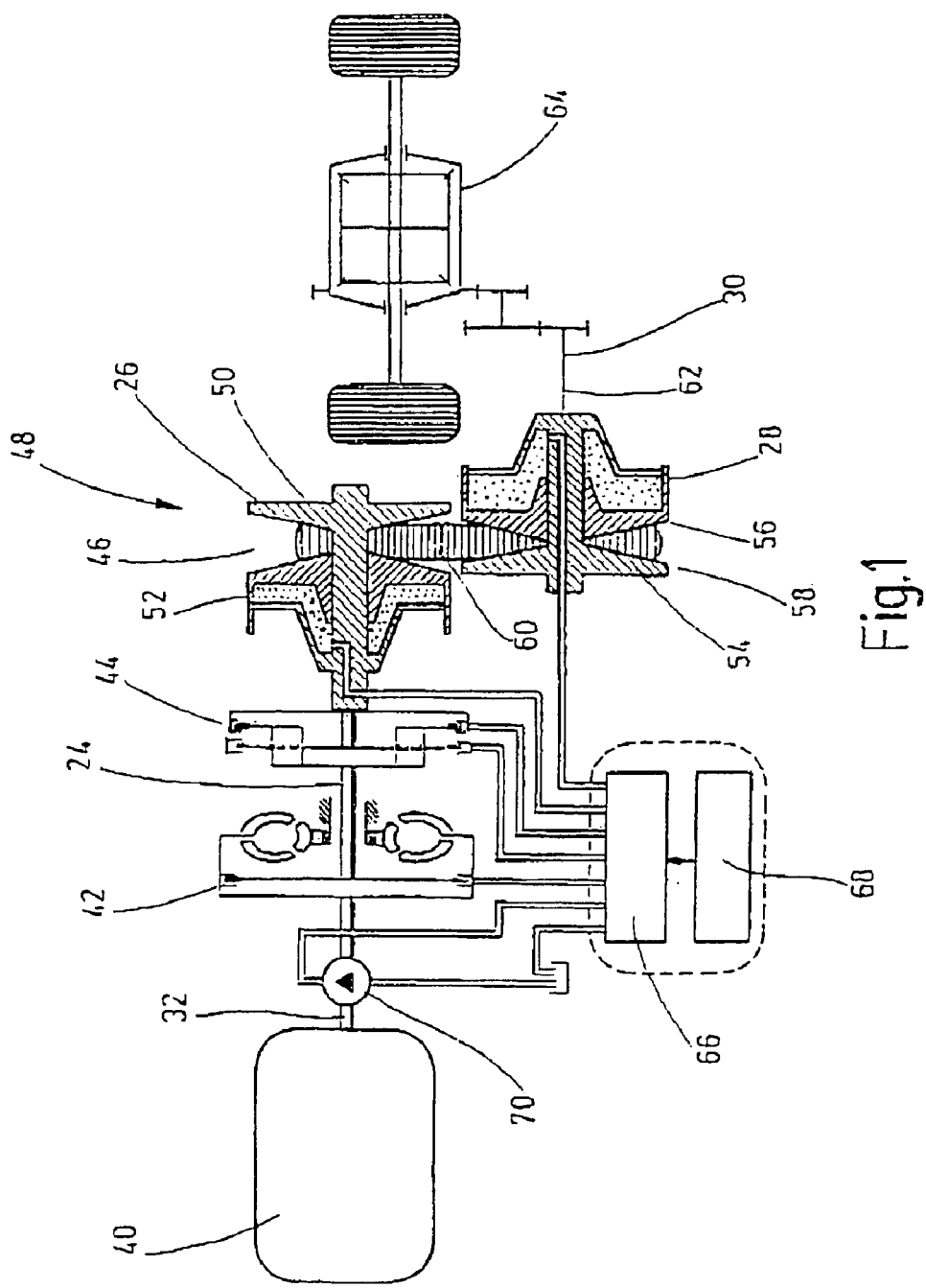
FIG. 1 shows a schematic of a drive system of a motor vehicle having a continuously adjustable transmission.

FIG. 1 shows a schematic of a drive system of a motor vehicle having a continuously variable transmission 48. An engine 40 is connected to the primary end 46 of a continuously variable transmission 48 via a converter 42 and a planetary wheel transmission 44. The continuously variable transmission 48 has two conical wheels (50, 52,) on the primary end 46 and two conical wheels (54, 56) on the secondary end 58. The conical wheel 52 on the primary end 46 is hydraulically adjustable. Likewise, the conical wheel 56 on the secondary end 58 is hydraulically adjustable. A thrust member belt 60 engages and wraps around the conical wheels (50, 52, 54, 56). The secondary end 58 of the continuously variable transmission 48 is connected to a compensating transmission 64 of the vehicle via an output shaft 62 and further components which are not explained further.

Furthermore, a hydraulic 66 is provided which is driven by a drive control 68. The hydraulic system includes a pump 70 which is operated by the motor 40 and therefore makes available the corresponding hydraulic pressure in the system. The following are driven by the hydraulics: the converter 42, the planetary wheel transmission 44, the adjustable conical wheel disc 52 on the primary end 46 of the continuously variable transmission 48 and the conical wheel disc 56 on the secondary end 58 of the continuously variable transmission 48. The driving of the transmission components via the hydraulics 66 takes place, inter alia, in dependence upon a selection lever position. In FIG. 1, additional signals are shown which can be considered in the plausibility considerations of the invention. The following are shown: the engine rpm 32, the primary rpm 26 of the continuously variable transmission 48, the secondary rpm 28 of the continuously variable transmission 48, the output rpm 30 and the turbine rpm 24.

Figure 2:
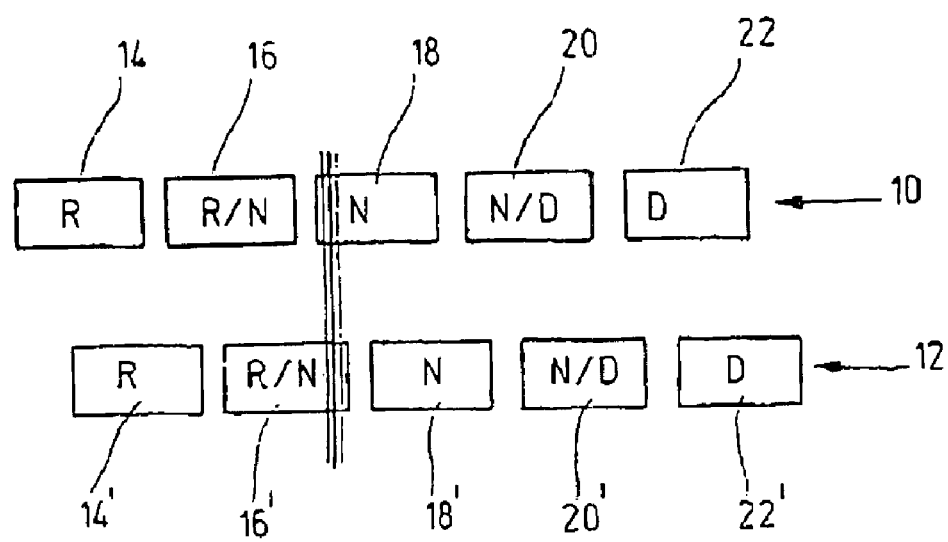
FIG. 2 is a diagram for explaining the determination of selection lever positions; and, FIG. 3 is a flowchart of a method of the invention.

In FIG. 2, the redundant determination of the selection lever position in accordance with the invention is shown. The perpendicular bar symbolizes the actual position of the selection lever. In the upper row, sensors 14, 16, 18, 20, 22 are shown. Corresponding sensors 14', 16', 18', 20', 22' are shown in the lower row. In this way, two units (10, 12) for detecting the selection lever position are present. If the selection lever lies over the sensor R (14, 14') in the particular unit, then a signal for the reverse gear is announced. If the selection lever in the particular units (10, 12) lies over the sensor N (18, 18') then a signal for idle is outputted. A selection lever over the sensors D (22, 22') of the units (10, 12) outputs a signal for normal driving operation. Furthermore, sensors R/N (16, 16') for an intermediate position between R and N as well as sensors N/D (20, 20') for an intermediate position between N and D are provided. It can be seen that the two units (10, 12) output different signals for the indicated selection lever position. The unit 10 outputs a signal for idle. The unit 12 outputs a signal for the intermediate position between the rearward gear and idle.

In the situation illustrated, one generally proceeds in that the lower unit 13 outputs a defective signal while the upper unit 10 outputs a correct signal because it is generally not intended by the driver to select an intermediate position. Accordingly, the signal of the lower unit 12 is first ignored and the signal of the upper unit 10 is viewed as correct. Thereafter, it is still possible to initiate additional plausibility considerations which are explained hereinafter with respect to FIG. 3 and the Table.

Figure 3:
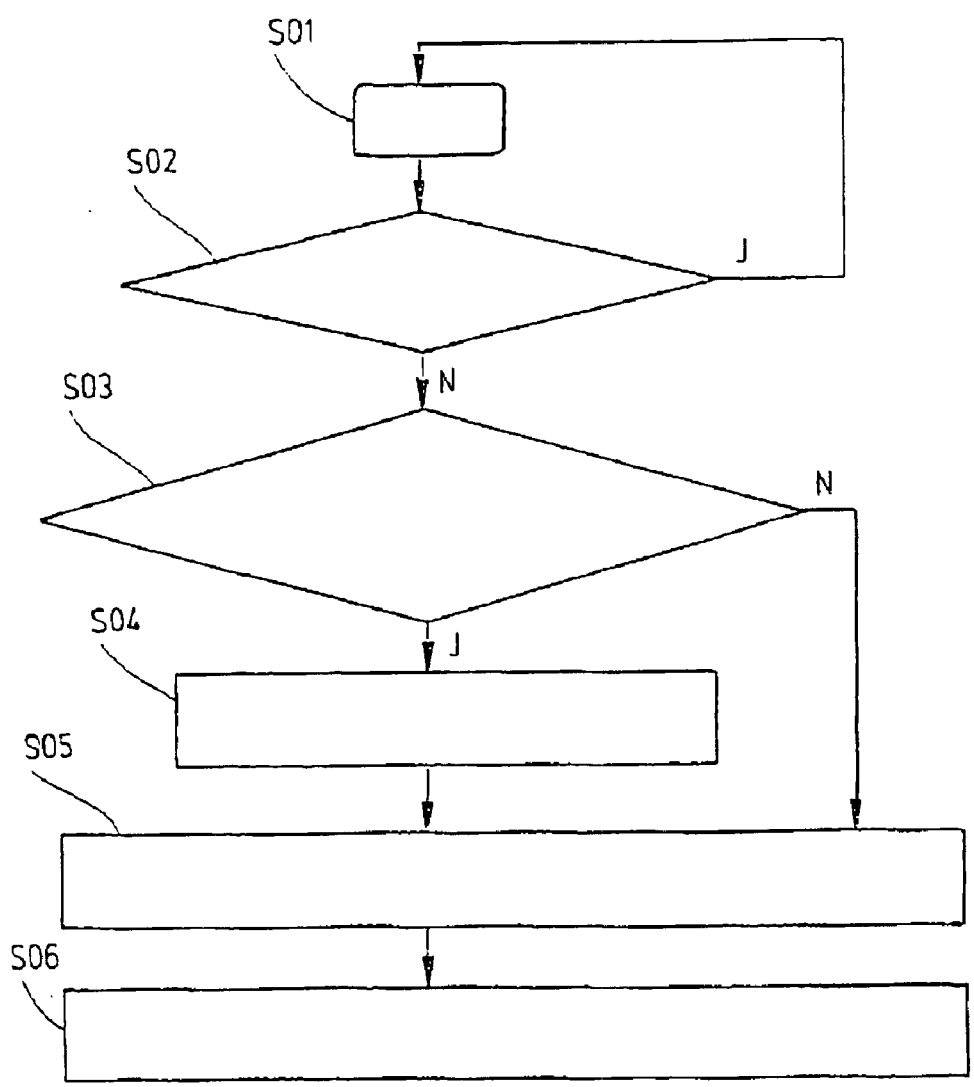

In FIG. 3, an exemplary sequence of a method of the invention is shown. First, the significance of the steps shown in FIG. 3 is given.

S01: Start.

S02: Is the first selection lever position signal equal to the second selection lever position signal?.

S03: First selection lever position signal or second selection lever position signal in the intermediate position? If required, determine the selection lever position signal located in the intermediate position. Exemplary result: first selection lever position signal in the intermediate position.

S04: Ignore first selection lever position signal; view second selection lever position signal as correct.

S05: Consider plausibility of the selection lever position signal based on a table, that is, compare to various motor and transmission signals.

S06: Decision for the first selection lever position signal or the second selection lever position signal as correct. Output a fault signal. Under circumstances, emergency measures, for example, limit the motor torque.

The sequence starts in step S02. In step S02, a check is made as to whether an equality is present between the selection lever position signals. If this is the case, then it is assumed that the determination of the selection lever position is correct and the sequence goes back to step S01. If no equality is present, then a check is made as to whether one of the selection lever position signals corresponds to an intermediate position. If this is not the case, an immediate transfer to step S05 takes place. However, if, for example, the first selection lever position signal is in the intermediate position while the second selection lever position signal does not correspond to an intermediate position, then there is a transfer to step S04. There, the intermediate position signal is ignored and the second selection lever position signal is viewed as preliminarily correct.

Thereafter, there is a transfer from step S04 to step S05. In step S05, a plausability of the selection lever position signals can take place based on a selection table. In this plausibility, a comparison to different signals is undertaken, for example, to motor and transmission signals.

In the next step S06, a decision is made as to whether the first selection lever position signal or the second selection lever position signal is to be viewed as correct. Under circumstances, a fault signal is outputted and furthermore, emergency measures can be taken such as, for example, a limiting of motor torque.

In the following tables, the various conditions are shown which can be considered in the plausibility considerations. There are numerous other quantities conceivable which can be used in the context of the present invention with respect to plausibility. In the following, some especially usable examples are given.

TABLES

| Selection Lever Position | Motor Rpm nmot | Turbine rpm ntu | Primary rpm npm |
|---|---|---|---|
| P | not relevant | nmot > ntu > nmot-OFF-set (for example, 100/min), ntu is slightly below the motor rpm | npm < threshold |
| R | not relevant | nmot > ntu > nmot-Off-set (for example, 200/min), ntu is slightly less than the motor rpm or is equal to nmot, for miact > threshold Exclusion of Overrun Operation | detection of rotation direction reversal |
| N | not relevant | nmot > ntu > nmot-Off-set (for example, 100/min), | npm < threshold or: |ntu- |

TABLES-continued

| | | ntu lies slightly below the motor rpm | npm\| > threshold and accelerator pedal = 0 |
|---|---|---|---|
| D | not relevant | nmot > nru > nmot-Off-set (for example, 200/min), ntu lies slightly below the motor rpm or is equal to nmot, for miact > threshold (excluding overrun operation) | \|ntu-npm\| < threshold |

| Selection Lever Position | Output rpm = vehicle speed nab = vfzg | Actual Torque miact | Parking Brake Signal B_brems |
|---|---|---|---|
| P | nab < threshold, vehicle at standstill | miact < threshold = f(nmot, tmot) -> drag torque | not relevant |
| R | 0 < vfzg < threshold = f (miact) -> vehicle rolls forward downhill (notwithstanding R), or: vfzg < 0 vehicle travels backwards, in the event that rotational direction detection is present, for example, via ABS wheel rpm sensors | | not relevant |
| N | not relevent | miact < threshold = f(nmot, tmot) -> drag torque | not relevent |
| D | | for vfzg = 0 (engine at idle): miact = f(nmot, tmot), engine power known | possible consideration of parking brake |

The above description of the embodiments according to the present invention serves only for illustrating purposes and not for the purpose of limiting the invention. In the context of the invention, various changes and modifications are possible without a departure from the extent of the invention as well as its equivalents.

What is claimed is:

1. A system for determining a gear selection utilizing a selection lever in an automatic transmission, the system comprising:
   at least two units for detecting the selection lever position generating respective signals corresponding to the detected selection lever position;
   means for evaluating said signals to determine the gear selection based on said signals while considering plausibility rules;
   wherein, with a first one of said signals and a second one of said signals, which correspond to different selection lever positions, a determination is made as to whether precisely one of said first and second signals corresponds to an intermediate position of the selection lever;
   that, if precisely one of the signals corresponds to an intermediate position of the selection lever, the other signal is subjected to a plausibility to determine the gear selection;
   that, if none of the signals corresponds to an intermediate position of the selection lever, said first one and said second one of said signals are subjected to a plausibility; and,
   wherein said plausibility uses said plausibility rules to determine the gear selection, which are based on the evaluation of one or several secondary signals.

2. The system of claim 1, wherein, when the signals are equal, the gear selection is determined corresponding to the selection lever position.

3. The system of claim 1, wherein the possible secondary signals belong to the group: turbine rpm, primary rpm, secondary rpm, output rpm, engine rpm, engine torque, parking brake signal.

4. The system of claim 1, wherein, when a first one of said signals and a second one of said signals correspond to different selection lever positions, a fault signal is outputted and/or emergency measures are taken.

5. The system of claim 1, wherein, a signal, which corresponds to an intermediate position of the selection lever, has the same significance as the non-presence of a signal corresponding to a selection lever position which is not an intermediate position.

6. The system of claim 1, wherein, a signal, which corresponds to an intermediate position of the selection lever, is explicitly determined via a sensor.

7. A method for determining the gear selection by means of a selection lover in an automatic transmission, the method comprises the steps of:
   detecting the selection lever position via at least two different paths and generating corresponding signals;
   evaluating said signals to determine the gear selection based on the signals while considering plausibility rules;
   wherein, for a first signal and a second signal, which correspond to different selection lever positions, a determination is made as to whether precisely one of the signals corresponds to an intermediate position of the selection lever;

that, if precisely one of the signals corresponds to an intermediate position of the selection lever, the other signal is subjected to a plausibility to determine the gear selection;

that, if none of the signals corresponds to an intermediate position of the selection lever, said first signal and second signal are subjected to a plausibility; and, wherein said plausibility uses said plausibility rules to determine the gear selection, which are based on the evaluation of one or several secondary signals.

8. The method of claim 7, wherein, for the same signals, the gear selection, which corresponds to the selection lever position, is determined.

9. The method of claim 7, wherein, the possible secondary signals belong to the group: turbine rpm, primary rpm, secondary rpm, output rpm, engine rpm, engine torque, parking brake signal.

10. The method of claim 7, wherein, when there are a first signal and a second signal, which correspond to different selection lever positions, a fault signal is outputted and/or emergency measures are taken.

11. The method of claim 7, wherein a signal, which corresponds to an intermediate position of the selection lever, has the same significance as the non-presence of a signal corresponding to a selection lever position which is not an intermediate position.

12. The method of claim 7, wherein a signal, which corresponds to an intermediate position of the selection lever, is explicitly determined via a sensor.

* * * * *

UNITED STATES PATENT AND TRADEMARK OFFICE
CERTIFICATE OF CORRECTION

PATENT NO.    : 6,935,203 B2                                           Page 1 of 1
DATED         : August 30, 2005
INVENTOR(S)   : Reinhard von Haeften, Klaus Ries-Mueller and Joachim Luh It is certified that error appears in the above-identified patent and that said Letters Patent is hereby corrected as shown below:

<u>Column 8,</u>
Line 56, delete "lover" and substitute -- lever -- therefor.

Signed and Sealed this

Eighth Day of November, 2005

JON W. DUDAS
*Director of the United States Patent and Trademark Office*